United States Patent [19]

Murphy

[11] Patent Number: 4,607,569
[45] Date of Patent: Aug. 26, 1986

[54] EGG-FRYING UTENSIL

[76] Inventor: Glenn M. Murphy, 1378 Los Coches Ct., Chula Vista, Calif. 92010

[21] Appl. No.: 685,915

[22] Filed: Dec. 26, 1984

[51] Int. Cl.⁴ ............................................. A47J 37/00
[52] U.S. Cl. ........................................ 99/426; 99/448; 99/449
[58] Field of Search ................. 99/426, 440, 448, 449, 99/423; 426/523, 614; D7/409

[56] References Cited

U.S. PATENT DOCUMENTS

| D. 162,041 | 2/1951 | Klein. | |
|---|---|---|---|
| D. 227,533 | 7/1973 | Christell. | |
| D. 257,202 | 10/1980 | Schessl. | |
| 982,044 | 1/1911 | Felger. | |
| 1,350,651 | 8/1920 | Hirst | 99/426 |
| 2,824,510 | 2/1958 | Gangwer. | |
| 4,345,516 | 8/1982 | Sinclair. | |
| 4,488,479 | 12/1984 | Sloan | 99/426 X |
| 4,512,250 | 4/1985 | Schindler | 99/426 X |

FOREIGN PATENT DOCUMENTS 225741  9/1910  Fed. Rep. of Germany ........ 99/426

Primary Examiner—Billy J. Wilhite
Attorney, Agent, or Firm—Brown, Martin & Haller

[57] ABSTRACT

A utensil for use in frying eggs on a grill includes a lower frame member defining a set of cylindrical or crescent-shaped outer rings in which to fry the eggs and an upper frame member defining a corresponding set of slightly smaller inner rings that fit concentrically within the outer rings for use in dislodging the eggs after they have fried. Suitable components movably mount the upper frame member on the lower frame member to enable one-handed operation in sliding the inner rings down the interiors of the outer rings as the upper and lower frame members are lifted together from the grill.

6 Claims, 5 Drawing Figures

EGG-FRYING UTENSIL

BACKGROUND OF THE INVENTION

This invention relates in general to cooking utensils and the like, and particularly pertains to a utensil for use in frying eggs on a grill.

Frying eggs on a grill includes the act of breaking the eggs, scrambling them if desired, placing them on the grill, and tending them as they fry to the desired hardness. It is often desireable as part of this process to fry the eggs in a desired shape so that they conform to the shape of an english muffin or croissant. And it is desirable to keep the eggs from running into each other as they fry side-by-side on the grill.

Existing utensils for use in frying eggs often do not adequately serve these purposes, and so it is desireable to have a new and improved cooking utensil for frying eggs on a grill.

It is desireable that the utensil accommodate a number of eggs laid closely side-by-side on a grill without letting the eggs run together.

It is desireable that the utensil retain the eggs in a predetermined shape as they fry and enable easy removal of the eggs when they are done.

And, it would be convenient if the utensil could be handled with one hand to leave the other hand free for associated work.

SUMMARY OF THE INVENTION

This invention recognizes the problems of the prior art and provides a new and improved utensil with the desired attributes.

An exemplary embodiment of an egg-frying utensil constructed in accordance with the invention includes a lower frame member that defines a set of outer rings in which to fry the eggs. An upper frame member is included that defines a corresponding set of inner rings for insertion in the outer rings to dislodge fried eggs.

The upper frame member is movably mounted on the lower frame member to enable each one of the inner rings to be slid down the interior of the corresponding one of the outer rings, and means are provided for simultaneously lifting the upper and lower frame members with one hand while operating the inner rings.

The above and other objects and many attendant advantages of the invention will become more fully apparent upon a reading of the detailed description in conjunction with the drawings wherein like numerals refer to like components throughout.

DETAILED DESCRIPTION

Figure 1:
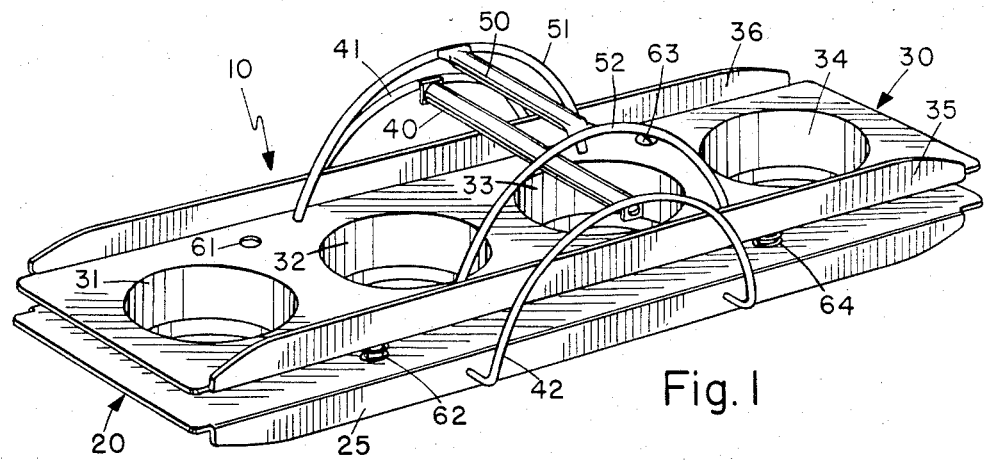
FIG. 1 of the drawings is a perspective view of an egg-frying utensil constructed in accordance with the invention.

An exemplary embodiment of an egg-frying utensil constructed in accordance with the invention is shown in FIG. 1 where it is referred to generally by reference number 10 and shown to include lower frame member 20 and upper frame member 30, along with lower handle 40 and upper handle 50. By grasping the two handles with one hand, the utensil can be simultaneously lifted from a grill and operated to dislodge fried egg.

The illustrated embodiment is of stainless steel construction so that it is attractive, durable, easily cleaned, and suitable for placement directly upon a hot grill. Lower frame member 20 defines four cylindrical rings, outer rings 21–24, and on either side of the lower frame member is formed a downwardly-extending flange, flanges 25 and 26. The lower frame member sets directly on a hot grill with the rings defining four separate enclosed areas in which eggs are placed to fry and the flanges providing both rigidity and handle supporting structure. This set, or plurality, of rings extend slightly beyond the flanges so that the rings and not the flanges set upon the grill.

Figure 2:
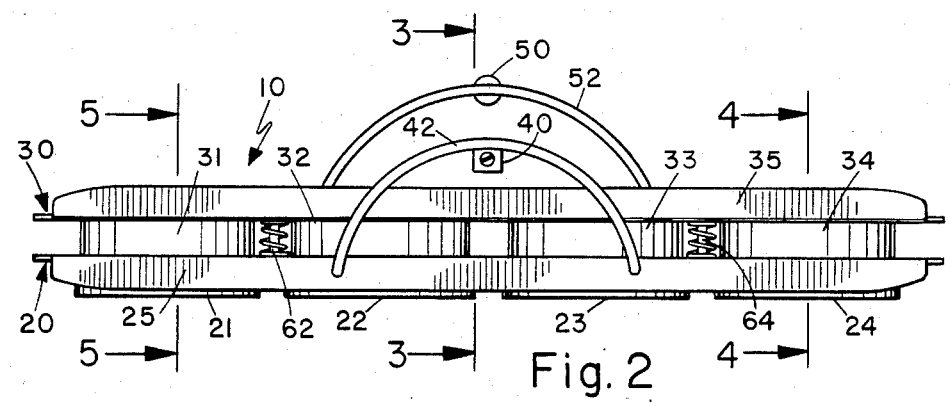
FIG. 2 is a side elevation view thereof.
Figure 3:
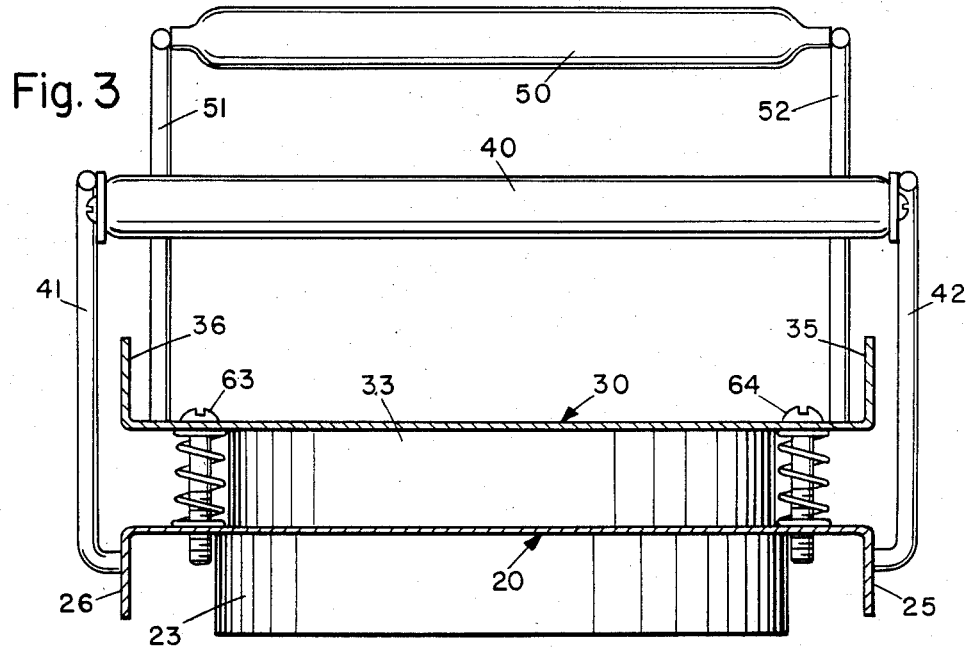
FIG. 3 is an enlarged sectional view taken on line 3—3 of FIG. 2.

Upper frame member 30 defines four, stainless steel cylindrical rings also, inner rings 31–34, and it includes upperwardly-extending flanges 35 and 36 for added rigidity. The inner rings are slightly smaller than the outer rings so that they fit within the outer rings in the manner illustrated in FIGS. 1–3, the outer diameter of the inner rings being slightly smaller than the inner diameter of the outer rings.

The upper frame member is moveably mounted on the lower frame member by suitable means such as screw-and-spring combinations 61–64. This mounting allows the upper frame member to move up and down in relationship to the lower frame member so that the inner rings can be manually slid up and down within the outer rings to dislodge fried egg. The screw-and-spring combinations spring bias the upper frame member so that the inner rings are somewhat elevated within the outer rings, but movable towards the lower frame member so that the inner rings slide downwardly within the outer rings to dislodge fried egg.

The lower frame member includes lower handle 40 which is attached by suitable means such as screws to handle supports 41 and 42 which are in turn welded or otherwise suitably secured to downwardly-extending flanges 25 and 26. Upper frame member 30 includes upper handle 50 attached by suitable means such as welding to handle supports 51 and 52 which are in turn welded or otherwise suitably secured to the upper frame member. Handle 40 and 50 of the illustrated embodiment are one-half inch outside diameter stainless steel tubes, and the handle supports are three-sixteenths inch stainless steel rod.

Figure 4:
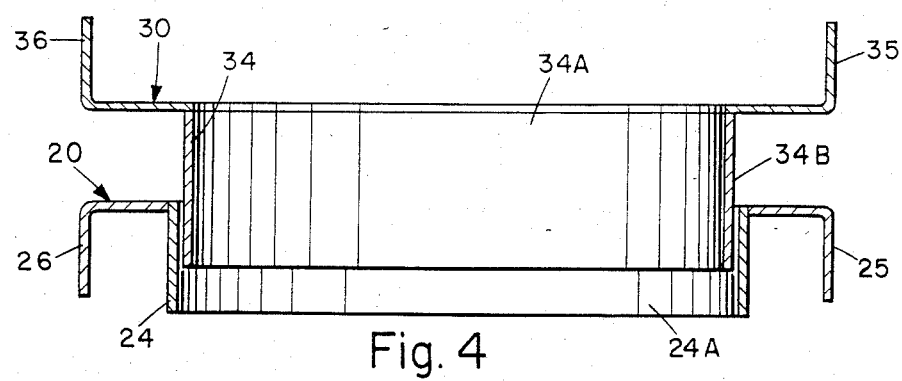
FIG. 4 is an enlarged sectional view taken on line 4—4 of FIG. 2.

Relative positioning of the inner and outer rings is illustrated in FIG. 4. Inner ring 34 is shaped and dimensioned to conform to the shape of and slid within outer ring 24. In the illustrated embodiment interior surface 24A of outer ring 24 and both interior surface 34A and exterior surface 34A of inner ring 34 are coated with a non-stick material such as Teflon to inhibit fried egg from sticking on the rings and to facilitate cleaning.

Figure 5:
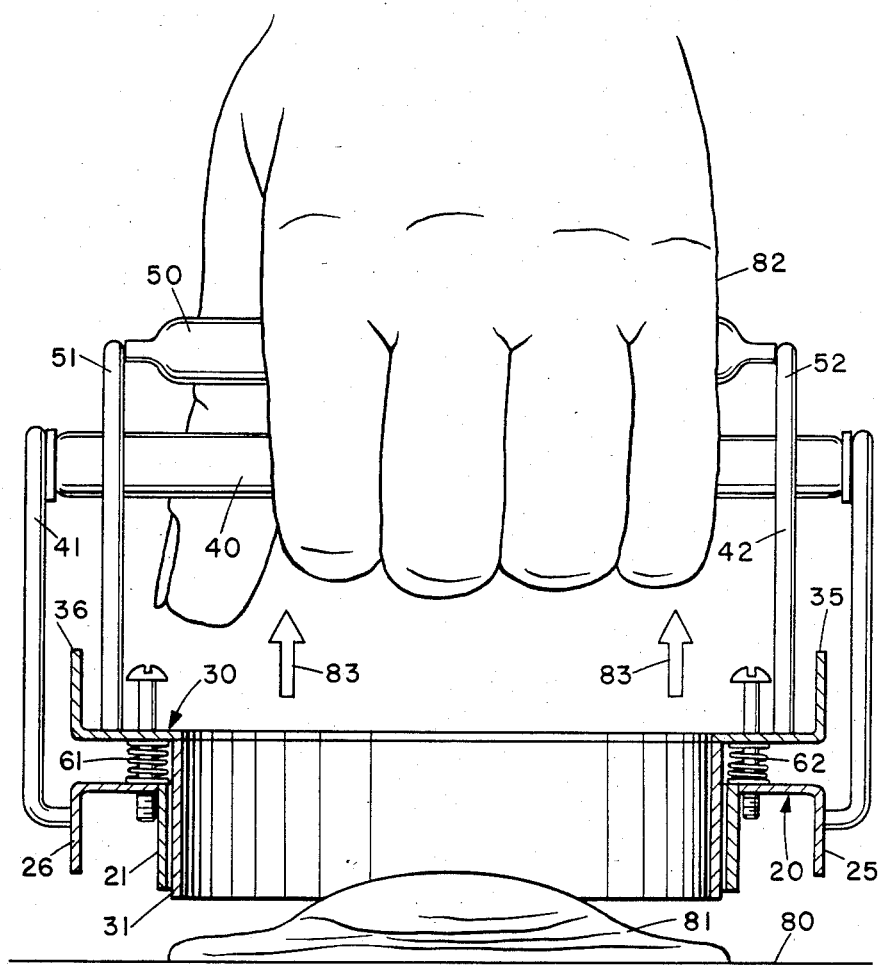
FIG. 5 is an enlarged sectional view taken on line 5—5 of FIG. 2, showing the ejection and removal action.

Operation of the egg-frying utensil is illustrated in FIG. 5 above a typical grill 80 on which egg 81 has been fried. A human hand designated reference numeral 82 is shown in place grasping the handles of the egg-frying utensil to lift it upwardly off of the grill in direction illustrated by arrows 83. Lower handle 40 is positioned below upper handle 50 so that the lower handle can be grasped with the fingers and pulled upwardly while the upper handle is pushed downwardly with the palm.

This type of squeezing action applied to the handles forces the two handles together and the upper frame member downwardly relative to the lower frame member so that the inner rings slide within the outer rings to dislodge the egg.

Thus, this invention provides a new and improved utensil for frying eggs side by side on a grill. With the outer rings of the illustrated embodiment having an inside diameter of approximately 3.75 inches and the rings being spaced apart about 4.5 inches, a handy utensil for frying eggs on a grill results. It keeps the eggs from running together and it can be used to form the eggs in the shape desired, circular rings having been employed in the illustrated embodiment although crescent-shaped rings or other shapes are within the inventive concepts herein disclosed.

A lower frame member defines a set of outer rings in which to fry the eggs, an upper frame member defines a corrresponding set of inner rings for dislodging the eggs after they have fried, and mounting means enables one-handed operation as the utensil is lifted from a grill.

As various changes may be made in the form, construction, and arrangement of the procedures and parts described herein, without departing from the spirit and scope of the invention and without sacrificing any of its advantages, it is to be understood that all matter herein is to be interpreted as illustrative and not in any limiting sense.

What is claimed is:

1. A utensil for use in frying eggs, which comprises:
   a lower frame member defining a set of outer rings in which to fry eggs on a grill;
   an upper frame member defining a corresponding set of inner rings, each one of the set of inner rings being slightly smaller than a corresponding one of the set of outer rings;
   means for movably mounting the upper frame member on the lower frame member to enable each one of the inner rings to be slid down the interior of the corresponding one of the outer rings to dislodge fried eggs as the upper frame member and the lower frame member are lifted from a grill.

2. The device recited in claim 1 which includes means enabling one-handed operation of the inner rings as the upper frame member and the lower frame member are lifted from a grill.

3. The device recited in claim 2 wherein the one-handed operation means comprises:
   a first handle attached to the lower frame member;
   a second handle attached to the upper frame member;
   means for spring-biasing the upper frame member relative to the lower frame member in an egg-frying position wherein the first handle and the second handle are positioned adjacent one another and the inner rings are within the outer rings; and
   means for enabling the inner rings to be slid down the interior of the outer rings by squeezing the first handle and the second handle together as the frame members are lifted from a grill to thereby dislodge fried eggs from the outer rings.

4. The device recited in claim 1 wherein the outer rings are cylindrically-shaped.

5. The device recited in claim 1 wherein the upper frame member and the lower frame member are composed of stainless steel.

6. The device recited in claim 1 wherein the upper frame member and the lower frame member are coated with a nonstick material to facilitate removal of fried egg.

* * * * *